April 7, 1936.　　　　　B. F. STOWELL　　　　　2,036,658
AUTOMATIC GRINDING MACHINE
Filed April 24, 1934　　　　8 Sheets-Sheet 2

INVENTOR
BYRON F. STOWELL
BY Chapin & Neal
ATTORNEYS

April 7, 1936.　　　　B. F. STOWELL　　　2,036,658
AUTOMATIC GRINDING MACHINE
Filed April 24, 1934　　　8 Sheets-Sheet 5

INVENTOR
BYRON F. STOWELL
BY Chapin & Neal
ATTORNEYS

April 7, 1936.                B. F. STOWELL                2,036,658
                        AUTOMATIC GRINDING MACHINE
                        Filed April 24, 1934         8 Sheets-Sheet 7

INVENTOR
BYRON F. STOWELL
BY Chapin & Neal
ATTORNEYS

April 7, 1936.  B. F. STOWELL  2,036,658
AUTOMATIC GRINDING MACHINE
Filed April 24, 1934  8 Sheets-Sheet 8

INVENTOR
BYRON F. STOWELL
BY Chapin & Neal
ATTORNEYS

UNITED STATES PATENT OFFICE 2,036,658

AUTOMATIC GRINDING MACHINE

Byron F. Stowell, Springfield, Mass., assignor to Van Norman Machine Tool Company, Springfield, Mass., a corporation of Massachusetts Application April 24, 1934, Serial No. 722,055

15 Claims. (Cl. 51—97)

This invention relates to grinding machines, and has particular applicability to oscillating grinders of the type used for grinding the races of ball bearings. In many respects the machine forming the subject matter of this invention is an improvement on that shown in my prior Patents 1,918,147, July 11, 1933, and 1,926,603, September 12, 1933. Reference may be made to those patents for a description of details omitted here.

One object of the invention is to provide a mechanism adapted by slight changes in electrical connections for several different types of grinding operations. A further object is to improve upon the carriage positioning mechanism shown in my Patent 1,918,147, and to provide mechanism whereby this mechanism may be returned to its inactive position automatically upon the termination of the grinding operation. Another object is to provide improved mechanism for regulating and for changing automatically the rate of cross feed given to the grinding wheel. Another object is to extend the automatic control to the supply of a cooling liquid, so that various combinations of wet and dry grinding may be employed as desired. Additional objects will appear from the following description and claims.

Referring to the drawings.

Figure 1:
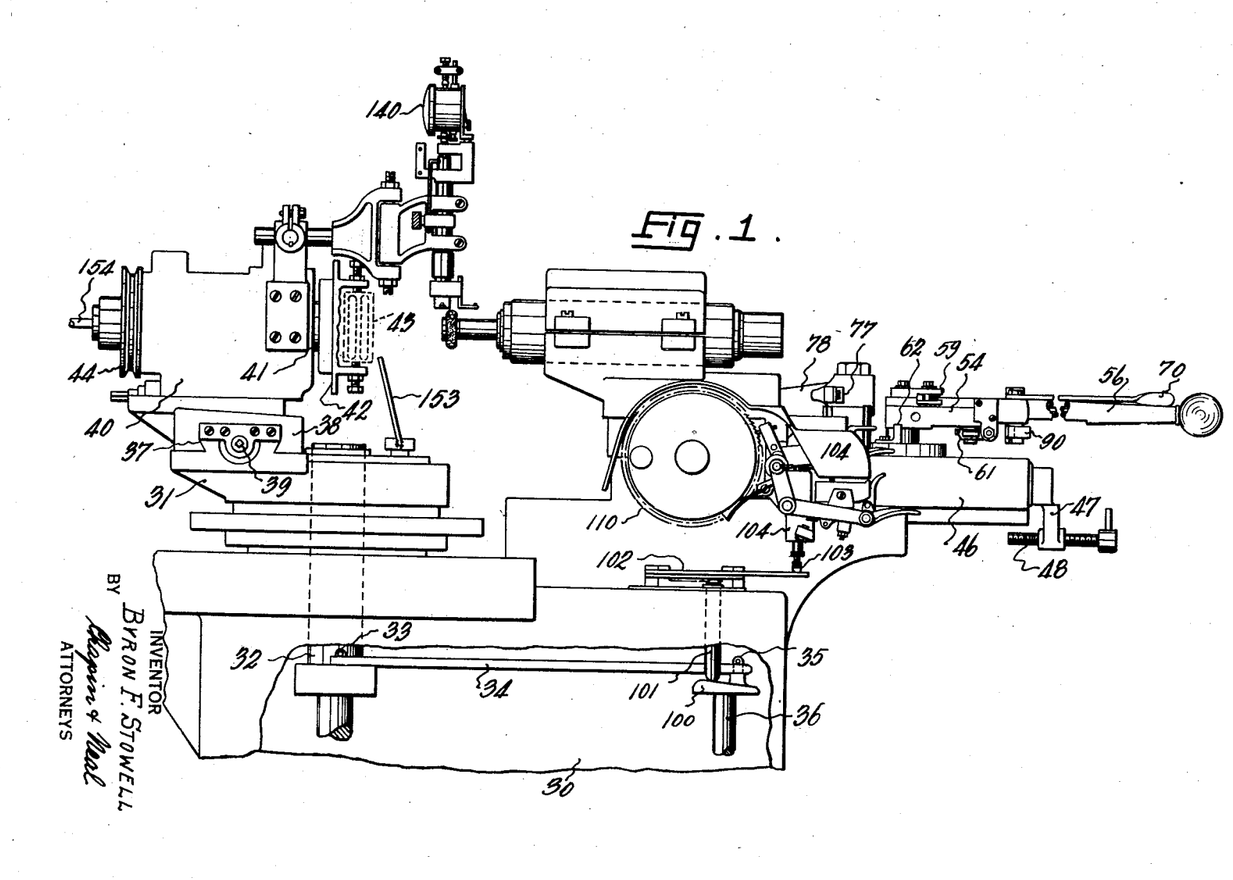
Fig. 1 is a fragmentary side elevation of a grinding machine embodying the invention.

The general construction of the machine will first be described with reference to Fig. 1, it being understood that this particular form of grinding machine has been chosen for purposes of illustration only and that the control mechanism is in certain aspects adaptable to grinding machines of other types. The machine is mounted upon a frame 30 upon which is mounted an oscillating head 31. As one form of oscillating mechanism for this head I have shown a spindle 32 projecting downwardly from the head 31 through the frame and carrying a crank pin 33. This pin is joined by a link 34 to a crank pin 35 mounted upon a shaft 36, which is suitably rotated continuously during the operation of the mechanism. Upon the oscillating head 31 are ways 37 upon which a slide 38 is adjustably positioned by a screw 39. The work head 40 is carried by this slide, and has a spindle 41 bearing at its inner end a chuck 42 in which the work piece 43 may be gripped. Rotation is imparted to the spindle by a pulley 44 around which passes a suitable belt coming from a motor or other source of power.

Figure 2:
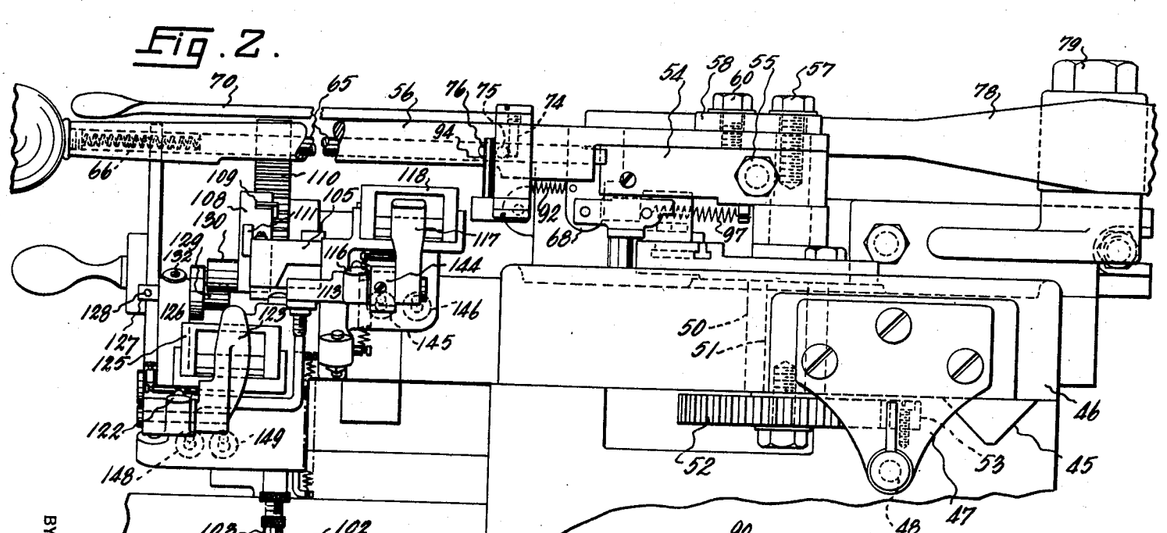
Fig. 2 is an end view of the machine, showing the cross feed mechanism and the mechanism for moving the carriage into or out of operative position with the work.

The frame 30 is supplied with ways 45 (Fig. 2) carrying a slide 46 which constitutes the means for moving the tool head in a direction parallel to the axis of the grinding wheel. An accurate limiting position of this slide is obtained by means of a bracket 47 overhanging the frame and carrying a stop screw 48, so that when the slide is moved the desired amount to bring the wheel in the correct longitudinal position relative to the work the screw will abut the frame and stop any further movement.

Mounted in the slide 46 is a bearing 50 in which is fitted a shaft 51. A gear 52 fixed to the lower end of this shaft meshes with a rack 53 on the frame so that by rotating the shaft it is possible to move the slide along its ways with a comparatively rapid motion. In order to rotate the shaft 51 a short arm 54 is clamped to it by a bolt 55. The arm 54 is not directly moved by the operator, but is actuated by connections to be described by a second arm 56 freely mounted on the shaft 51 by a stud 57. A cam plate 58, bearing at its end a contact roll 59 (Fig. 4), is also positioned under the head of the stud 57, and is held in adjusted position relative to the arm 56 by a stud and slot connection 60. The arm 54 is adapted to be moved from the position of Fig. 1, in which the tool-carrying slide is completely retracted, to the position of Figs. 4 and 5 in which the slide has reached its maximum position of advance with the screw 48 in contact with the frame. In the latter position a latch 61 on the arm 54 engages a stationary shoulder 62 to hold the arm fixed, the shoulder being formed on a member 63 adjustably secured to an arcuate T slot on the slide 46.

Figure 3:
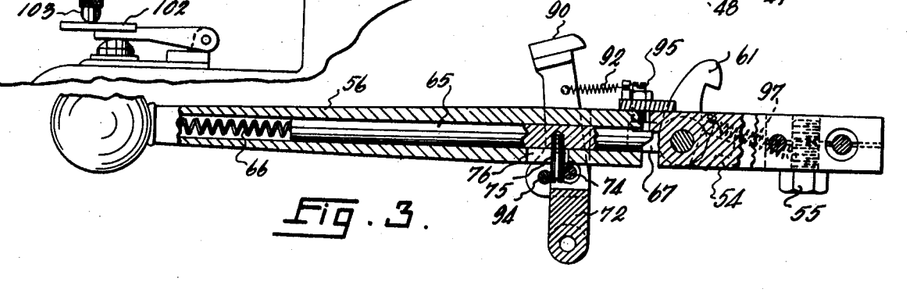
Fig. 3 is a top plan detail of certain of the mechanism shown in Fig. 1, partly in section.
Figures 4, 5, 6:
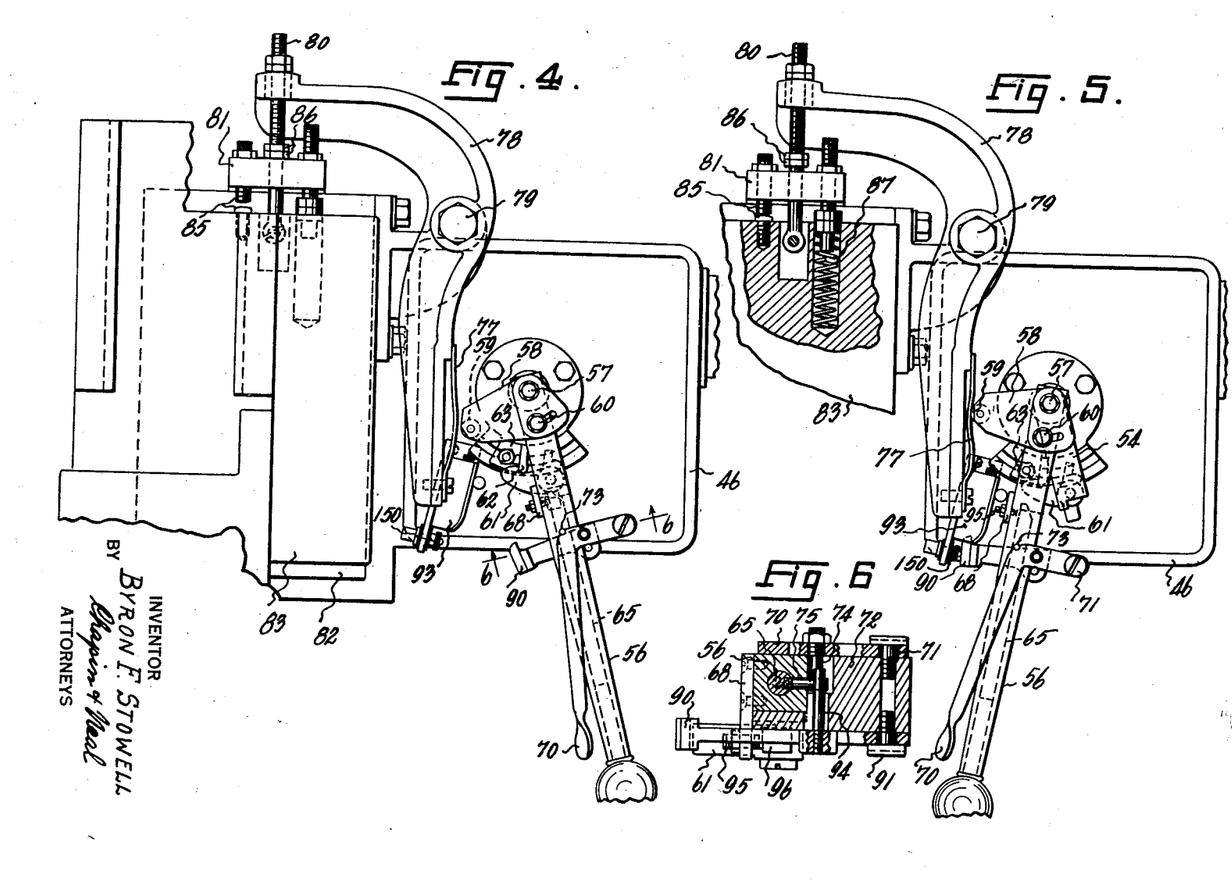
Figs. 4 and 5 are details, in top plan, of the carriage positioning mechanism, with the parts shown in different positions.
Fig. 6 is a detail, on an enlarged scale, taken on line 6—6 of Fig. 4.

Engagement between the arms 54 and 56 is normally accomplished by a plunger 65 located within the arm 56 and as shown in Fig. 3, pressed by a spring 66 towards the pivot of the arm. When held in its inner limit of motion the end of this plunger lies in back of a projection 67 on the arm 54, a plate 68 on the arm 56 engaging the other side of this projection so that the shorter arm is securely held. After the parts have been moved to the position of Fig. 3 it is necessary to unlatch the two arms in order that the arm 56 may be continued in its motion to perform other functions. This is done by retracting the plunger 65 by a handle 70. The handle is pivoted at 71 to a bracket 72 on the arm 56, and normally rests against a stop pin 73. A pin 74 (Figs. 3 and 6) extends downwardly from the handle 70 so as to lie at one side of a pin 75 attached to the plunger and extending through a slot 76 in the arm 56. If the handle is brought towards the side of the arm the plunger will be retracted sufficiently to clear the projection 67 and permit the arm 56 to continue in its movement as shown in Fig. 5.

When the arm is at its ultimate limit of motion the roller 59 bears against a spring 77 secured to the side of a rocker 78 pivoted to the slide 46 at 79. At its rear end this rocker has a rod 80 attached to it, the rod passing freely through a bracket 81 secured to a cross slide 82 and coupled to a second slide 83 mounted for movement upon the first and in the same direction. The first slide is attached to the cross feed screw 84 of usual type, threaded into a nut (not shown) in the main slide 46 so that the cross feeding motion of slide 82 can be controlled accurately as will be described below. At the time when the mechanism now under consideration is in use the cross feed is not active, and for my present purposes the slide 82 can be considered as if fixed on the slide 46. As the rocker 78 turns, therefore, it will move the upper slide 83 back a slight amount on the lower slide, sufficient to place the wheel in or out of operative relation to the work. The movement of the wheel into engagement with the work occurs in two parts, a longitudinal motion of the slide 46, and a cross motion of the slide 83. The subsequent feed during grinding is accomplished by the slow motion of slide 82. Definite limits to the travel of slide 83 on slide 82 are set by abutments 85 and by stop collars 86 on the rod 80. A spring 87 is provided to move the slide 83 in a direction to separate the wheel from the work when the rocker is released.

A latch 90 is pivoted at 91 (Fig. 6) to the bracket 72, and is drawn by a spring 92 (Fig. 3) so as to engage an electromagnetic releasing catch 93 (Figs. 4 and 5) of the type shown in Fig. 19 of my prior Patent 1,926,603. A full description of the action of this type of catch being found in said patent, it will not be repeated here. It suffices to say that when an electrical impulse is sent through the device by mechanism to be described the arm 56 and the rocker will be released, and the slide 83 will at once move to its inactive position, separating the grinding wheel and the work. If it is desired to release the arm 56 manually this can be done through the handle 70 which moves plunger 65, the pin 75 on the plunger contacting a pin 94 on the latch 90 and moving it out of engagement with the catch 93. When the arm 56 is brought back to alignment with the arm 54 the beveled end of plunger 65 will ride over the projection 67 into the position shown in Fig. 3. At the same time a screw 95 on the plate 68 contacts with the tail 96 of latch 61 to move the latch against its spring 97 and release it from the shoulder 62. Further movement of arm 56 towards the position of Fig. 1 will now cause the slide 46 to be moved longitudinally of the frame.

The mechanism for rotating the screw 84 and thus causing the cross feeding movement of slide 82 is generally similar to that shown in my prior Patent 1,926,603, but has several features of improvement. Upon the vertical shaft 36 previously mentioned is a cam 100 (Fig. 1) upon which rests, outside the path of movement of the crank pin 35, a push rod 101. The upper end of this push rod strikes a plate 102 pivoted to the frame and operating as in said prior patent to afford a contact surface, independent of the longitudinal adjustment of the slide 46, for a tappet 103 slidable vertically in a feeding head 104 carried by the slide. The upper end of the tappet underlies an arm 105 pivoted to the head at 106. A pawl arm 107 is connected to the arm 105 for motion therewith, and has pivoted to it a pawl carrier 108 secured to which is a pawl blade 109. A ratchet 110 is secured to the screw 84, and as the arm 105 is oscillated by the tappet this ratchet will be advanced by the pawl step by step in amounts dependent upon the throw given to the arm.

A spring 111 is secured to the pawl arm 107 and bears against the pawl carrier, so that the pawl will be pressed yieldingly against the ratchet except when it is positively moved away to discontinue the feeding movement. This is done by a contact piece 112 mounted on an arm 113 and adapted to strike a pin 114 on the pawl carrier to move it from the position of Figs. 7 and 10 to that of Fig. 12. The arm 113 is pivoted to the head 104 at 115, and carries a handle 116 and a latch 117 adapted to engage an electrically releasable catch 118. A spring 119 serves both to pull the arm downwardly when the catch is released and to hold the latch in yielding engagement with the catch when the arm is raised.

Figures 7, 8, 9, 10, 11:
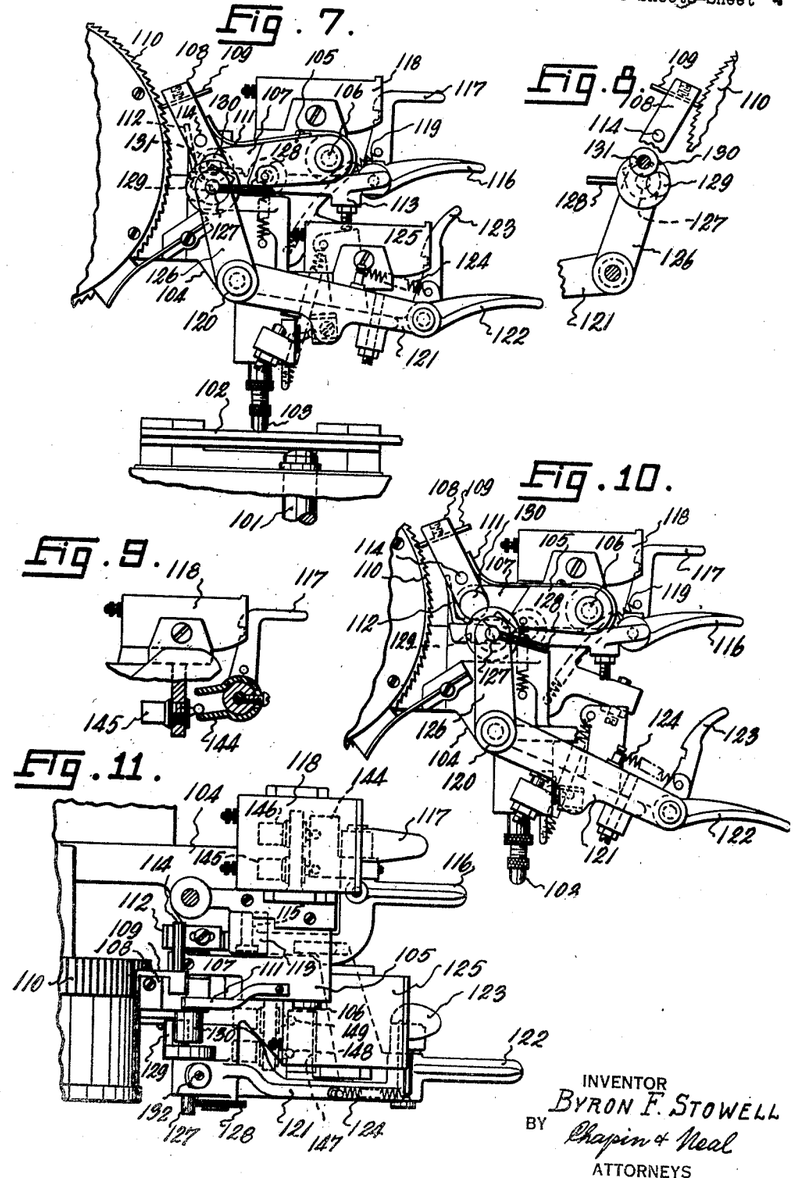
Fig. 7 is a side elevation of the cross feed actuating mechanism.
Fig. 8 is a detail, looking from the rear side, of parts shown in Fig. 7.
Fig. 9 is a detail corresponding to a portion of Fig. 7 but with certain parts broken away to disclose other mechanism.
Fig. 10 is a view similar to Fig. 7 but showing a different position of the parts.
Fig. 11 is a top plan view of the mechanism shown in Fig. 7.

The mechanism for reducing the amount of feed given to the ratchet at each elevation of the tappet is somewhat different from that shown in my prior patent. Pivoted to the head 104 at 120 is an arm 121 having a handle 122 and a latch 123 drawn inwardly by a spring 124. When the arm is raised the latch is held by an electrically releasable catch 125. The arm 121 has an extension 126 bearing a pin 127 having a handle 128 at one end and an eccentric stud 129 at the other. A stud 130 carried by the pivot 131 joining the pawl arm 107 and pawl carrier 108 is adapted to contact with the stud 129 when the pawl arm is in its lowered position, as seen in Fig. 8. By turning the handle 128 the position of the eccentric stud can be varied, a set screw 132 serving to hold it in adjusted position. The stud thus serves as an adjustable abutment which, when interposed in the path of the pawl carrier, varies the distance the pawl carrier can follow the tappet 103 on its downward stroke. A lost motion connection is thus introduced into the drive of the pawl, the extent of which can be varied to change the stroke of the latter and thus the amount of rotation given at each operation to the ratchet.

Figures 12, 13, 14, 15:
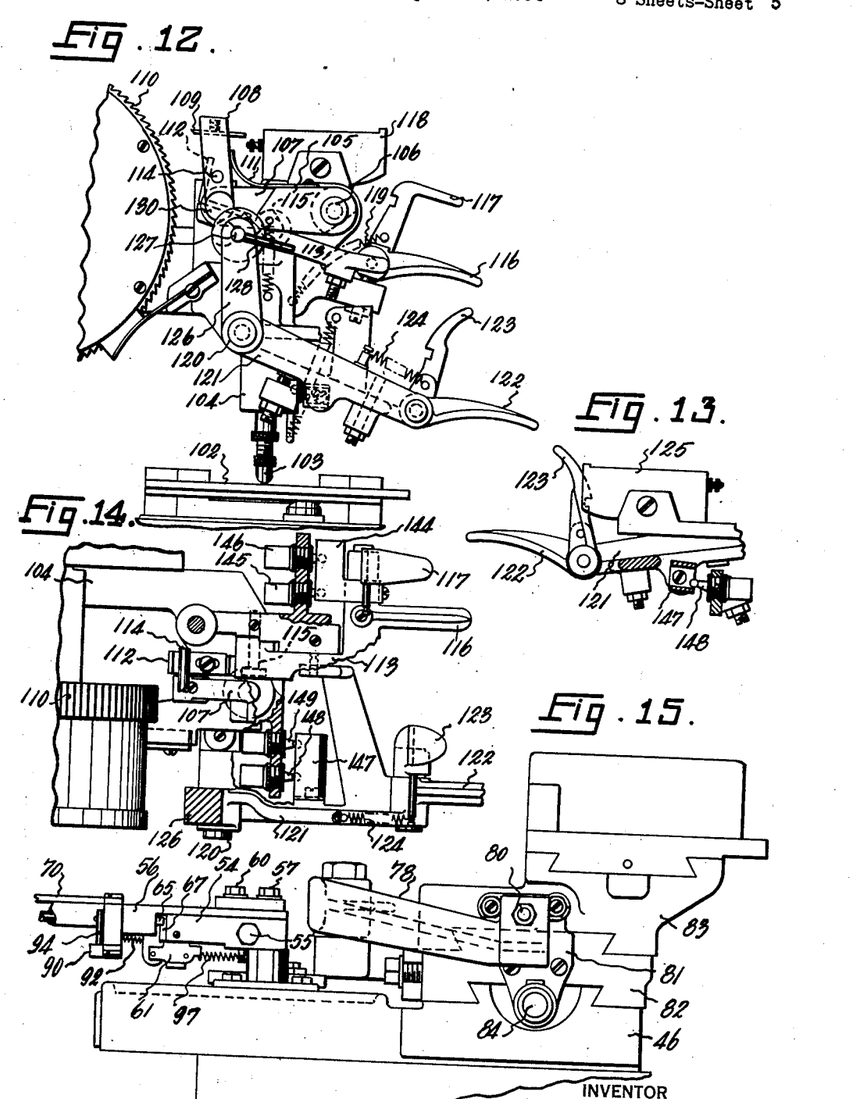
Fig. 12 is a view similar to Figs. 7 and 10 but showing the parts in position for the complete disconnection of the cross feed.
Fig. 13 is a detail looking from the rear in Fig. 7.
Fig. 14 is a view similar to Fig. 11 but with certain parts broken away.
Fig. 15 is a rear view of the machine.

The present apparatus is designed for use with the electrical gauge controlling mechanism shown in my Patent 1,926,603. As the mechanism is the same, the gauge has not been illustrated in detail. The gauge itself is denoted by the character 140, the first or roughing cut contact points by 141 (Figs. 16 to 21) and the second or finishing cut contact points by 142. These contacts are, in the present invention, used not only to control the rate of feed of the grinding wheel, but also to control other operations which will appear from the following discussion. As in the prior patent, the arms 113 and 121 are arranged to operate certain switches upon their release, but in the present case each arm controls a pair of switches having different functions. The arm 113, as shown in Figs. 9 and 14, has a channel-shaped member 144 embracing the handles of a pair of toggle switches 145 and 146. Arm 121 has a channel-shaped member 147 embracing the handles of a pair of toggle switches 148 and 149. Of these switches 145 and 148 are normally open, and 146 and 149 are normally closed; normal in each case referring to the condition with the arms 113 and 121 in their inactive or lowered position. A fifth switch 150 is positioned to be contacted with by the slide moving arm 56 as this is moved into position to be held by the catch 93. The latter switch is normally open, and serves to energize the whole control mechanism when the arm is thrown into catch engaging position.

Associated with this control mechanism are several individual units which may be of standard commercial manufacture and, therefore, need not be described in detail. A transformer 151 (Fig. 16) serves to convert the voltage (usually 110 volts) in the line 152 to the lower voltage (usually 16 volts) suitable for operation of the control mechanism. For controlling the supply of cooling fluid to the work from the usual pump through pipes 153 and 154 (Fig. 1) a solenoid valve 155 is used, normally open and closed at intervals through a relay or contactor 156. A time delay relay 157, also of standard type, may be employed where certain operations are to take place after a predetermined time from the actuation of the control circuits.

Figure 16:
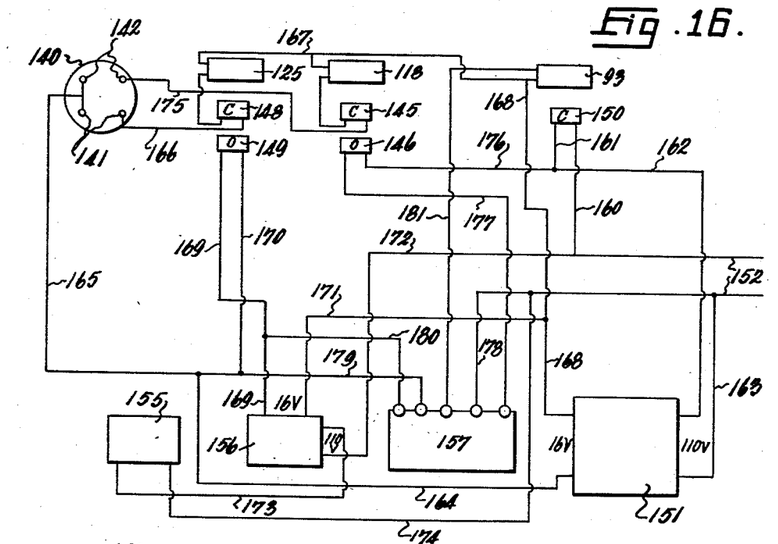
Figs. 16 to 21 are diagrams showing the manner of connecting the apparatus electrically for different operating sequences.

Several control circuits to which the apparatus above lends itself will now be described. The first circuit to be considered is shown in Fig. 16, and utilizes all of the apparatus. The switch 150, closed by member 90 on the arm 56 when the latter is moved to place the wheel in operative engagement with the work, is connected to one side of the line 152 at 160, and is connected at 161 and 162 to one side of the primary of the transformer 151, the other side of which is connected to the line at 163. Since the control circuit derives its current from the secondary of the transformer the switch 150 acts to throw the entire control mechanism into operation. In this and other cases, the switches are given the designation C when they are closed by the movement of the control arms 56, 113, 121 into latched position, and O when they are opened by this movement. The arms 113 and 121 have of course been raised, and are held by the catches 118 and 125 since no current is flowing through these catches. The raising of these arms closes the switches 145 and 148 and opens the circuits through switches 146 and 149, so that the devices controlled by the latter two switches will be inactive. The cooling water valve 155 is open when no control current flows, and operates to permit water flow during the entire grinding operation except as stated. The grinding wheel will be fed with its coarse feed until the gauge contacts 141 close.

When this occurs current will flow from the transformer secondary through the lines 164, 165, the contacts 141, the line 166, switch 148, catch 125, and lines 167 and 168 back to the transformer. This energizes the catch and releases the lever 121. As the lever falls it opens switch 148, breaking the circuit described, and closing switch 149. The closure of this switch completes a circuit through lines 164, 169, and 170, the control or low voltage side of the contactor 156, and lines 171 and 168 to the secondary of the transformer. As the control side of the contactor is energized it allows current to flow from one side of the main line 152 through lines 172 and 173, the solenoid valve 155, and line 174 back to the other side of the main line. Valve 155 is normally open, and its closure shuts off the flow of cooling water to the work.

The machine continues to finish feed without cooling water until the gauge contacts 142 close. Current will then pass through lines 164, 165, contacts 142, line 175, switch 145, catch 118, and lines 167 and 168 to the transformer. The catch 118 is immediately released by the passage of current through it, and arm 113 drops, closing switch 146 and opening switch 145 so that no further current can pass through the gauge points 142. Closure of switch 146 permits current from the main line to pass through lines 160, 161, 176, 177, and 178 to the time delay relay 157, setting this in action. As is usual in this type of relay, a primary contactor is immediately closed and a timing motor started which, after the lapse of the time for which the device is set opens the first or primary contactor and closes another or secondary one. The closure of the primary contactor permits current to continue to flow through the relay coil of the valve operating contactor 156 by the path 164, 179, 180, 169, 171 without passing through the switch 149, thus taking some of the load off from the latter. This is not essential, but since the commercial time relays have this immediately closing contactor as well as a time delayed contactor it is preferred to use it. After the motor of the time delay relay has closed the secondary contactor current can flow through the path 164, 179, 181, and 168 through the lever holding catch 93. When current passes through this catch the arm 56 will be released, moving the wheel out of contact with the work, and opening the switch 150. This kills the entire control circuit and opens the valve 155, which it will be remembered is open except when current is passing through the relay coil of its contactor 156.

Summarizing the operation of the device with the connections of Fig. 16, the grinding starts with a rough feed, with the cooling water flowing. When the contacts 141 are closed the change from rough to finish grinding occurs and the water is shut off. After the contacts 142 are closed the feed is stopped and the work is dry ground without relative advance of the work and wheel for a period of time determined by the operation of the time delay relay. To permit this dry grinding the contacts 142 are set so as to act at a work size differing by a predetermined amount from that desired in the finished work.

Figure 17:
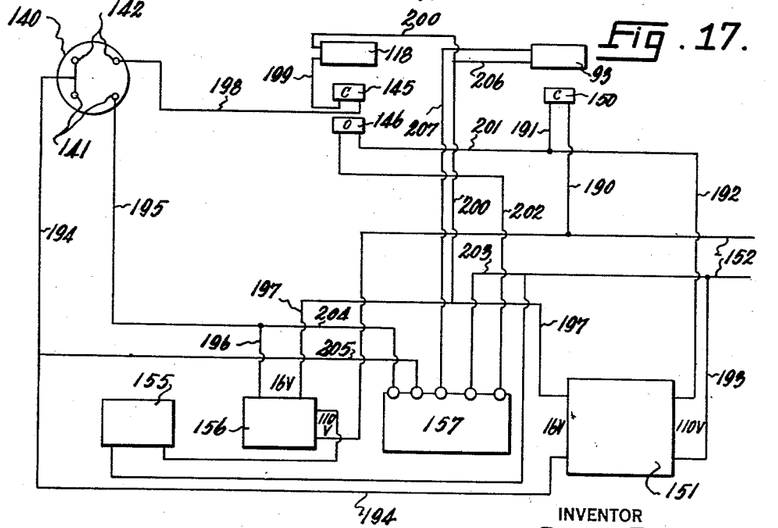

In the arrangement of parts shown in Fig. 17 the arm 113 and its attendant parts are not used, only one rate of feed being employed. The switch 150 is closed as before, making a circuit through the primary of the transformer 151 through the path 190, 150, 191, 192, and 193 from the main line 152. When the contacts 141 close, current flows through the path 194, 141, 195, 196, 156, and 197 from the transformer, energizing the relay 156 and shutting off the water during the finish grind. No change in feed rate occurs. When the finish grind has progressed sufficiently to operate the contacts 142 the path 194, 142, 198, 145, 199, 118, 200, 197 is completed to the transformer, the current tripping the catch 118 and allowing arm 121 to fall. This opens switch 145, breaking the circuit through the gauge points 142, and closes switch 146. A path 190, 150, 191, 201, 146, 202, 203 is thus provided from the main line through the energizing coil of the time delay relay 157, closing its primary contactor and starting the timing motor. The primary contactor acts somewhat as before, short-circuiting the contacts 141 through the path 204, 205 and avoiding injury due to long continued current through the gauge points. When the secondary contactor is closed a circuit 197, 200, 206, 93, 207, 205, 194 is provided between the transformer secondary and the slide latch 93, which is at once released; moving the wheel to inactive position and breaking the circuit through the control devices. The normally open valve 155 of course then again permits the flow of cooling water. This arrangement gives a constant feed, at first under wet conditions and then under dry; with a period of drift, or grinding without feed, under dry conditions. The work piece is cooled by the flow of cooling water before removal.

Figure 18:
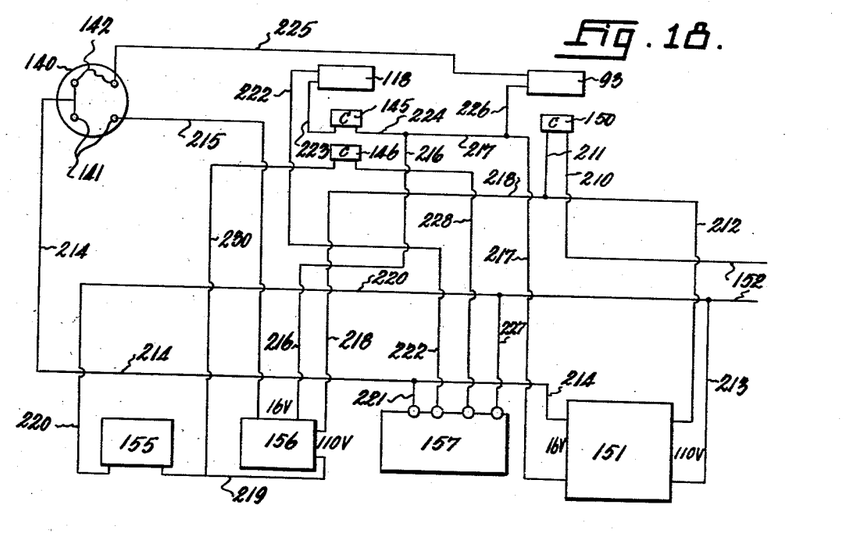

In Fig. 18 a somewhat similar arrangement is shown, the switch 146 being, however, closed when arm 121 is up. The switch 150 admits current to the primary of the transformer 151 through path 210, 150, 211, 212, 151, 213. Grinding proceeds with the normal feed, water on, until the contacts 141 are actuated. A path 214, 141, 215, 156, 216, 217, 151 is thus provided, energizing the relay coil 156 and permitting current from the line 152 to flow through the path 210, 150, 211, 218, 156, 219, 155, and 220. This closes the valve 155 and shuts off the supply of cooling water. At the same time the closing of the circuit through the high voltage side of relay 156 permits current to flow through path 220, 227, 157, 228, 146, 230, 219, 218, energizing the time relay. Grinding proceeds under the constant feed until the time relay closes its secondary contactor, whereupon current flows through the path 214, 221, 222, 118, 223, 145, 224, 217, 151, and releases the catch 118. The resulting fall of arm 121 opens switches 145 and 146, opening the circuits through the catch and the time relay. Grinding proceeds, still without cooling water, until the final gauge contacts 142 are actuated, when a circuit is provided through the path 214, 142, 225, 93, 226, 217, 151, and the catch 93 is released. This removes the wheel from contact with the work, and opens switch 150, discontinuing all current through the control circuits and permitting valve 155 to open. The work is thus cooled before removal.

Figure 19:
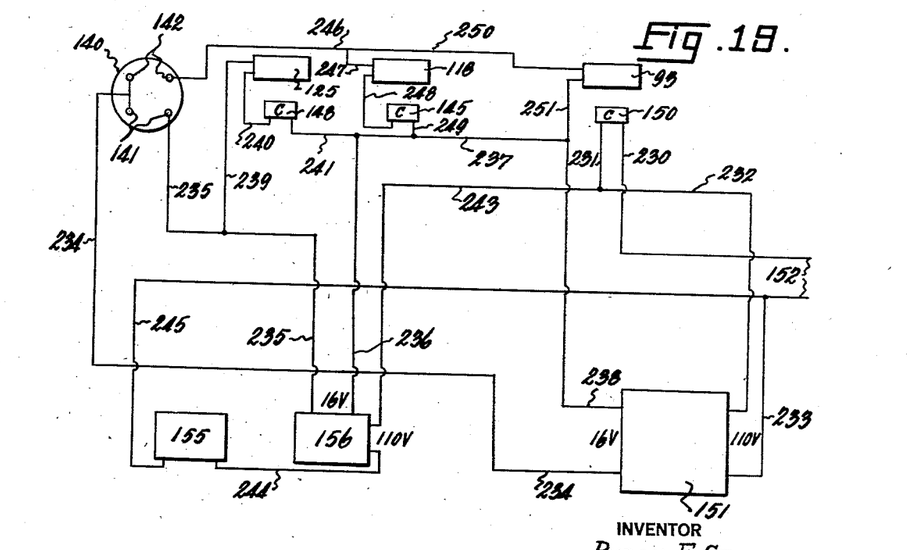

In Fig. 19 the time relay has not been used. On the initiation of the grinding operation switch 150 is closed by arm 56. A path 230, 150, 231, 232, 151, 233 is thus provided to energize the primary of the transformer. Valve 155 is in its normally open position and switches 145 and 148 are closed as arms 113 and 121 are raised. When contacts 141 are closed a double path is provided; first through 234, 141, 235, 156, 236, 237, 238 and 151, and second through 234, 141, 235, 239, 125, 240, 148, 241, 237, 238, and 151. The current in the first path energizes the relay 156 and permits current to flow from the main line through 230, 150, 231, 243, 156, 244, 155 and 245, so as to close the valve 155. The current in the second circuit releases catch 125 and permits the arm 113 to fall, reducing the rate of wheel feed and also opening said second circuit by means of switch 148. Grinding goes on at the finishing rate until contacts 142 close. A path 234, 142, 246, 247, 118, 248, 145, 249, 237, 238, 151 is thereby set up, releasing catch 118 to stop the wheel feed and opening the circuit by switch 145. A second path 234, 142, 246, 250, 93, 251, 238, 151 is also set up, releasing catch 93 and removing the wheel from the work. As before, the water is turned on by the deenergizing of valve 155 when switch 150 automatically opens.

Figure 20:
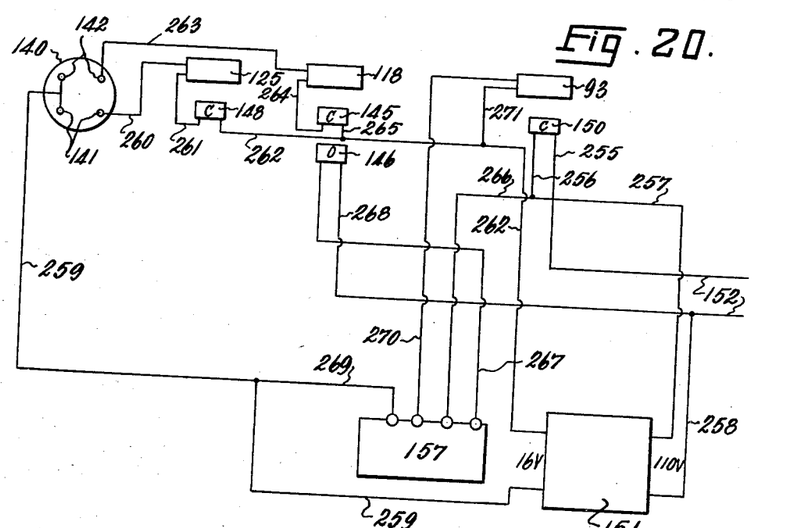

The arrangement of Fig. 20 dispenses with the cooling water control, but uses the time relay switch. When arm 56 is swung into position to be held by catch 93 it closes switch 150, presenting a path 255, 150, 256, 257, 151, 258 to the primary of the transformer. Grinding proceeds with a coarse feed until contacts 141 are closed, forming a path 259, 141, 260, 125, 261, 148, 262, 151 which releases the catch 125 to make the changeover to the finishing feed. This circuit is opened immediately by means of switch 148. Grinding proceeds then with a fine feed until the contacts 142 close, presenting a path 259, 142, 263, 118, 264, 145, 265, 262, 151 which releases catch 118 and is itself immediately broken by switch 145. The wheel is still in contact with the work, but without relative feeding motion. The fall of arm 121 also closes switch 146 and forms a path 255, 150, 256, 266, 157, 267, 146, 268 which starts the time delay relay. After the period for which the relay is set has elapsed its secondary contactor will close, and a path 259, 269, 157, 270, 93, 271, 262, 151 will be presented which will release catch 93 and open switch 150.

Figure 21:
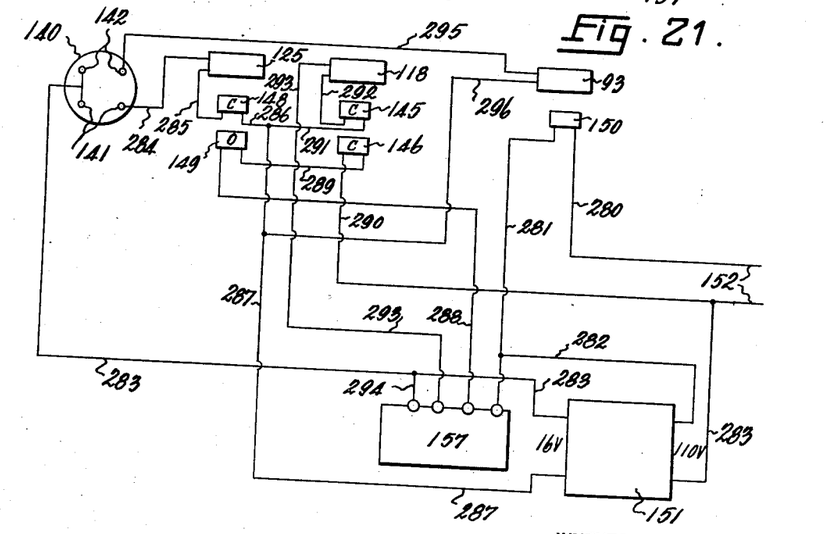

Fig. 21 shows a somewhat similar arrangement. The switch 150 as before initiates the operation, offering a path 280, 150, 281, 282, 151, 283 to the primary of the transformer. When the grinding under coarse feed has proceeded to the point where contacts 141 close, a path 283, 141, 284, 125, 285, 148, 286, 287, 151 is provided which releases catch 125, opens its circuit through switch 148, changes from coarse to finish feed, and closes switch 149. In this case switch 146 is closed and switch 149 open when the arms 113 and 121 are held up by catches 118 and 125. A circuit 280, 150, 281, 157, 288, 149, 289, 146, 290 is thus provided which starts the time relay 157. As soon as the secondary contactor has been actuated a path 287, 291, 145, 292, 118, 293, 157, 294, 283, 151 is set up which releases catch 118, breaks its circuit by opening switch 145, and opens switch 146, disconnecting the time relay. Grinding is continued by drifting, the wheel and work remaining in contact without relative feed until contacts 142 close. A circuit 283, 142, 295, 93, 296, 237, 151 is thus set up which releases catch 93 and opens switch 150 by the consequent release of arm 56. The grinding operation is thus ended.

What I claim is:

1. An automatic control for grinding machines of the type having feeding mechanism for causing relative approach of the wheel and work and having controllable apparatus to provide a flow of coolant onto the work, a single feeler in continuous engagement with the work being ground for gauging the progress of the grinding operation, a plurality of electric circuits each having a switch and an electro-magnetic device therein and being actuable by movement of the feeler, one of said devices being connected to stop the feeding mechanism upon actuation of its switch, another of said devices being connected upon actuation of its switch to actuate the coolant control apparatus and thereby vary the flow of coolant during the progress of the grinding operation, and separate control mechanisms actuated through movement of the feeler to minimize arcing in said switches.

2. In a grinding machine of the type having mechanism for causing relative approach of the wheel and work and having controllable apparatus to provide a flow of coolant onto the work, sizing mechanism including a feeler to contact the work during the grinding process and electrical contact devices controlled by said feeler, an electric circuit through which current is permitted to pass by the closure of said contact devices, means to open said circuit immediately after the initial flow of current therein whereby only a momentary flow of current occurs, means operable by said momentary current for stopping the relative approach of the wheel and work, and means controlled by movement of the feeler for varying the flow of coolant.

3. In a grinding machine of the type having feeding mechanism for causing relative approach of the wheel and work and including a ratchet and a pawl device adapted to provide variable feeding impulses thereof, sizing mechanism including a feeler to contact the work during the grinding process and electrical contact devices closed by said feeler, a plurality of electrical circuits through which current is permitted to pass by the closing of said contact devices, means to open one of said circuits immediately after the initial flow of current therein whereby only a momentary flow of current occurs, means operable by said momentary current to interrupt the normal feeding impulse through said pawl device, and means operable through the momentary closing of another of said electrical circuits to actuate mechanism whereby the wheel and work will be separated.

4. In a grinding machine of the type having feeding mechanism for relative approach of the wheel and work, sizing mechanism including a feeler to contact the work throughout the grinding process, electrical contact devices closed by said feeler, a plurality of electrical circuits through which current is permitted to pass by closure of said contact devices, means to open one of said circuits immediately after the initial flow of current occurs, means operable by said momentary current for interrupting the approach of the wheel and work, and means initiated by movement of the feeler and actuatable through the momentary closing of another of said circuits to effect a separation of the wheel and work.

5. An automatic control for grinding machines of the type having feeding mechanism for causing relative approach of the tool and work, a single feeler in continuous engagement with the work being ground for gauging the progress of the grinding operation, means including an electric circuit having a switch and an electromagnetic device therein, which is connected to stop the feeding mechanism upon closure of the switch, control mechanism which is actuated by movement of the feeler to a predetermined position when the work has been ground to a required size and which in turn closes the switch rapidly and insures the minimum of arcing thereof, mechanism including a second switch which operates automatically after the actuation of the electromagnetic device to reopen the circuit and prevent flow of current through the switch governed by the feeler, and means including a time delay device caused to function upon the actuation of one of said switches which is connected to separate the tool and work after a predetermined time interval.

6. In a grinding machine of the type having mechanism for causing relative approach of the wheel and work, sizing mechanism including a feeler to contact the work during the grinding process, and electrical contact devices controlled by said feeler, an electrical circuit through which current is permitted to pass by the closure of said contact devices, means to open said circuit immediately after the initial flow of current therein whereby only a momentary current occurs, and means operable by said momentary current for separating the wheel and the work.

7. In a grinding machine of the type having mechanism for causing relative approach of the wheel and the work, sizing mechanism including a feeler to contact the work during the grinding process and electrical contact devices controlled by said feeler, an electrical circuit through which current is permitted to pass by the closure of said contact devices, means to open said circuit immediately after the initial flow of current therein whereby only a momentary flow of current occurs, means operable by said momentary current for stopping the relative approach of the wheel and work, and a time delay relay started by said momentary current and operable after the lapse of a predetermined time to separate the wheel and work.

8. An automatic control for grinding machines of the type having feeding mechanism for causing relative approach of the wheel and work and having apparatus to provide a flow of coolant onto the work, a single feeler for gauging the progress of the grinding operation, mechanisms operable to produce upon their individual actuation different functions during the sequence of the grinding operation, electromagnetic control means operable upon a momentary flow of current to actuate said mechanisms, electrical contacts progressively closed by movement of the feeler in its motion resulting from the continuance of the grinding operation, which cause said momentary flow of current, mechanism caused to function by closing one of said circuits to thereby vary the flow of coolant upon the work, mechanism caused to function by closing another of said circuits for suspending the approach of the wheel and work for a predetermined interval of time and upon the termination of said interval being operable to actuate other mechanism for causing the wheel to be separated from the work.

9. An automatic control for grinding machines of the type having feeding mechanism for causing relative approach of the tool and work, a feeler for gauging the progress of the grinding operation, mechanisms operable to produce upon their individual actuation different functions in the sequence of the grinding operation, electromagnetic control means operable upon a flow of current to actuate said mechanisms two electrical circuits having switches closed rapidly and successively by movement of the feeler in its motion resulting from the continuance of the grinding operation, mechanism caused to function by closing one of said circuits to vary the speed of the feeding movement, mechanism caused to function by closing another of said circuits for suspending the approach of the tool and work for a predetermined interval of time and upon the termination of said interval being operable to actuate mechanism whereby the tool will be separated from the work, means including a separate switch which automatically breaks each electric circuit after its switch has been closed and prevents arcing in the switch governed by the feeler, and mechanism which automatically removes the tool from grinding contact with the work.

10. An automatic control for grinding machines of the type having feeding mechanism for causing relative approach of the tool and work, a feeler for gauging the progress of the grinding operation, mechanisms operable to produce upon their individual actuation different functions in the sequence of the grinding operation, electromagnetic control means operable upon a flow of current to actuate said mechanisms, two electrical circuits having switches closed rapidly and successively by movement of the feeler in its motion resulting from the continuance of the grinding operation, mechanism caused to function by closing one of said circuits to vary the speed of the feeding movement, mechanism caused to function by closing another of said circuits which cause the tool to be separated from the work, and means including a separate switch which automatically breaks each electric circuit after its switch has been closed and prevents arcing in the switches governed by the feeler.

11. An automatic control for grinding machines of the type having feeding mechanism for causing relative approach of the wheel and work, a single feeler resting on the work for gauging the progress of the grinding operation, a plurality of electric circuits, each having an electromagnet and a switch therein, means operated by one circuit and electromagnet to change the rate of tool feed from a roughing to a finish cut, means operated by another circuit and electromagnet to stop the wheel feed, a time delay device caused to function upon the actuation of one of said switches to permit a normal drift die-out of wheel cutting and being operable thereafter to actuate mechanism whereby the wheel will be separated from the work, and mechanism including another switch, which operates automatically after the actuation of one of the electromagnetic devices to reopen the circuit and prevent flow of current through the switch governed by the feeler.

12. An automatic control for grinding machines of the type having feeding mechanism for causing relative approach of the wheel and work, and having controllable apparatus to provide a flow of coolant fluid onto the work, a feeler for gauging the progress of the grinding operation, a plurality of electric circuits, each having an electromagnet and a switch therein, means operated by one circuit and electromagnet to change the rate of feed of the feeding mechanism from a roughing to a finish cut, means operated by another circuit to suspend the movement of the feeding mechanism for a predetermined interval of time and thereafter to actuate mechanism to separate the wheel and work and upon such separation to actuate said fluid control apparatus, control mechanism which is actuated by movement of the feeler when the work has reached a desired size to close one of said switches rapidly and insure a minimum of arcing thereof, and mechanism which operates automatically after the actuation of the electromagnetic device to reopen the circuit and prevent flow of current through the switch governed by the feeler.

13. An automatic control for grinding machines of the type having feeding mechanism for causing relative approach of the wheel and work, and having controllable apparatus to provide a flow of coolant fluid onto the work, a plurality of electric circuits, each having an electromagnet and a switch therein, means operated by one circuit and electromagnet to change the rate of feed of the feeding mechanism from a roughing to a finish cut and to actuate the controllable apparatus and thereby stop the flow of coolant, means operated by another circuit to suspend the movement of the feeding mechanism for a predetermined interval of time and thereafter to actuate mechanism to separate the wheel and work and upon such separation to again actuate said controllable apparatus and reopen the flow of coolant upon the work, a single feeler for contacting the work during the grinding process and means controlled by said feeler for actuating said circuits.

14. A cross feed mechanism for grinding machines comprising a ratchet, a pawl engageable with the ratchet, members forming a lost motion connection to impart periodic movement to the ratchet, an abutment element movable with the pawl, a lever, an adjustably positioned abutment carried by the lever and operable to engage the first named abutment, to thereby reduce the extent of the lost motion, and means for actuating said lever.

15. A cross feed mechanism for grinding machines comprising a ratchet, a pawl member engageable with the ratchet and having an abutment portion thereof remote from the ratchet engaging portion, members forming a lost motion connection to impart periodic movement to the ratchet, a lever, an eccentric stud adjustably rotatable on the lever and operable to engage said abutment, to thereby reduce the extent of the lost motion, and automatic means for actuating the lever.

BYRON F. STOWELL.